(12) United States Patent
Jensen

(10) Patent No.: US 8,521,021 B2
(45) Date of Patent: Aug. 27, 2013

(54) METHOD AND APPARATUS FOR SWITCHING OPTICAL WAVELENGTHS

(75) Inventor: Richard A. Jensen, Lexington, MA (US)

(73) Assignee: Polatis Photonics, Inc., Billerica, MA (US)

( * ) Notice: Subject to any disclaimer, the term of this patent is extended or adjusted under 35 U.S.C. 154(b) by 1374 days.

(21) Appl. No.: 12/075,468

(22) Filed: Mar. 11, 2008

(65) Prior Publication Data

US 2008/0232800 A1 Sep. 25, 2008

Related U.S. Application Data

(60) Provisional application No. 60/906,699, filed on Mar. 13, 2007.

(51) Int. Cl.
*H04J 14/00* (2006.01)

(52) U.S. Cl.
USPC .............. 398/48; 398/45; 398/49; 398/50; 398/79; 398/56; 398/57; 385/24; 385/16; 385/17; 385/18

(58) Field of Classification Search
USPC .......... 398/45, 48, 49, 50, 56, 57, 79, 82, 398/83, 84, 85; 385/24, 16, 17, 18, 37
See application file for complete search history.

(56) References Cited

U.S. PATENT DOCUMENTS

| | | | | |
|---|---|---|---|---|
| 6,449,073 B1 * | 9/2002 | Huber | | 398/82 |
| 6,771,905 B1 * | 8/2004 | Bortz | | 398/45 |
| 7,027,732 B2 * | 4/2006 | Paiam et al. | | 398/50 |
| 7,764,881 B2 * | 7/2010 | Aoki | | 398/2 |
| 2006/0034610 A1 * | 2/2006 | Akiyama et al. | | 398/83 |
| 2006/0098981 A1 * | 5/2006 | Miura et al. | | 398/45 |
| 2008/0181605 A1 * | 7/2008 | Palacharla et al. | | 398/50 |

FOREIGN PATENT DOCUMENTS

| | | |
|---|---|---|
| EP | 1 703 762 A | 9/2006 |
| WO | WO 2006/005191 A | 1/2006 |
| WO | WO 2008/112202 A3 | 9/2008 |

OTHER PUBLICATIONS

Notification Concerning Transmittal of International Preliminary Report on Patentability, including Written Opinion of the International Searching Authority, for International Application No. PCT/US/2008/003168, dated Sep. 15, 2009, consisting of 7 pages.

Eramo, V., et al., "Dimensioning Models of Shared Resources for Optical Packet Switching in Unbalanced Input/Output Traffic Scenarios," *IEICE Transactions on Communications, Communications Society*, Tokyo Japan E89-B (6), pp. 1505-1516, May 1, 2006.

International Search Report for PCT/US2008/003168, date of mailing Sep. 18, 2008.

* cited by examiner

*Primary Examiner* — Hanh Phan

(74) *Attorney, Agent, or Firm* — Hamilton, Brook, Smith & Reynolds, P.C.

(57) ABSTRACT

An example embodiment of the present invention is a non-blocking wavelength switching architecture that enables graceful scaling of a network wavelength switching node from small to large fiber counts using fixed size bidirectional 1×N Wavelength Selective Switches (WSS). The architecture uses an intermediate broadcast and select layer implemented using optical splitters and WSSs to eliminate wavelength blocking.

8 Claims, 17 Drawing Sheets

METHOD AND APPARATUS FOR SWITCHING OPTICAL WAVELENGTHS

RELATED APPLICATION

This application claims the benefit of U.S. Provisional Application No. 60/906,699, filed on Mar. 13, 2007. The entire teachings of the above application are incorporated herein by reference.

BACKGROUND OF THE INVENTION

In currently known network architectures utilizing Wavelength Selective Switches (WSSs), the number of fiber lines a switching node can handle is typically limited by the size of the WSSs being used. For example, a non-blocking switching node built utilizing 1×9 WSSs has only nine outputs and is limited to nine fiber lines without some sort of architectural adaptation. Typically, the adaptation involves cascading WSSs such that at least one output of a first WSS is optically coupled to the input of a second WSS that is used to further demultiplex the input signal and provide more interconnects to build a larger non-blocking wavelength switching node. There are numerous ways to cascade the WSSs to get more output lines that can be used to interconnect larger nodes. However, typical broadcast and select methods to cascade WSSs to scale a network wavelength switching node are expensive in terms of the number of WSSs needed, can result in large and variable optical signal losses, and do not provide a high degree of design flexibility.

SUMMARY OF THE INVENTION

An example embodiment of the present invention is a non-blocking wavelength switching architecture that enables graceful scaling of a network wavelength switching node from small to large fiber counts using fixed size bidirectional 1×N Wavelength Selective Switches (WSSs). The architecture uses an intermediate broadcast and select (subnet broadcast) layer implemented using optical splitters and WSSs with blocking functionality to reduce both the number of WSSs and minimize the optical signal losses as the wavelength switching node scales to larger sizes. The architecture also enables the wavelength switching node to scale without disturbing existing network traffic in the node.

Embodiments of the present invention include a first plurality of blocking WSSs, a second plurality of blocking WSSs, splitters coupled to the first plurality of blocking WSSs, combiners coupled to the second plurality of blocking WSSs, and optical paths associating the first plurality of blocking WSSs with the second plurality of blocking WSSs. In some embodiments, the splitters are coupled via their input ports to output ports of the first plurality of blocking WSSs. In these embodiments, the optical paths are coupled to output ports of the splitters. In other embodiments, the splitters are coupled via their output ports to input ports of the first plurality of blocking WSSs. In these other embodiments, the optical paths are coupled to output ports of the first plurality of blocking WSSs.

In further embodiments, the combiners are coupled via their output ports to input ports of the second plurality of blocking WSSs. In these further embodiments, the optical paths are coupled to input ports of the combiners. In other embodiments, the combiners are coupled via their input ports to output ports of the second plurality of blocking WSSs. In these other embodiments, the optical paths are coupled to the input ports of the second plurality of blocking WSSs.

In other embodiments, the optical paths include an optical switch.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1A:
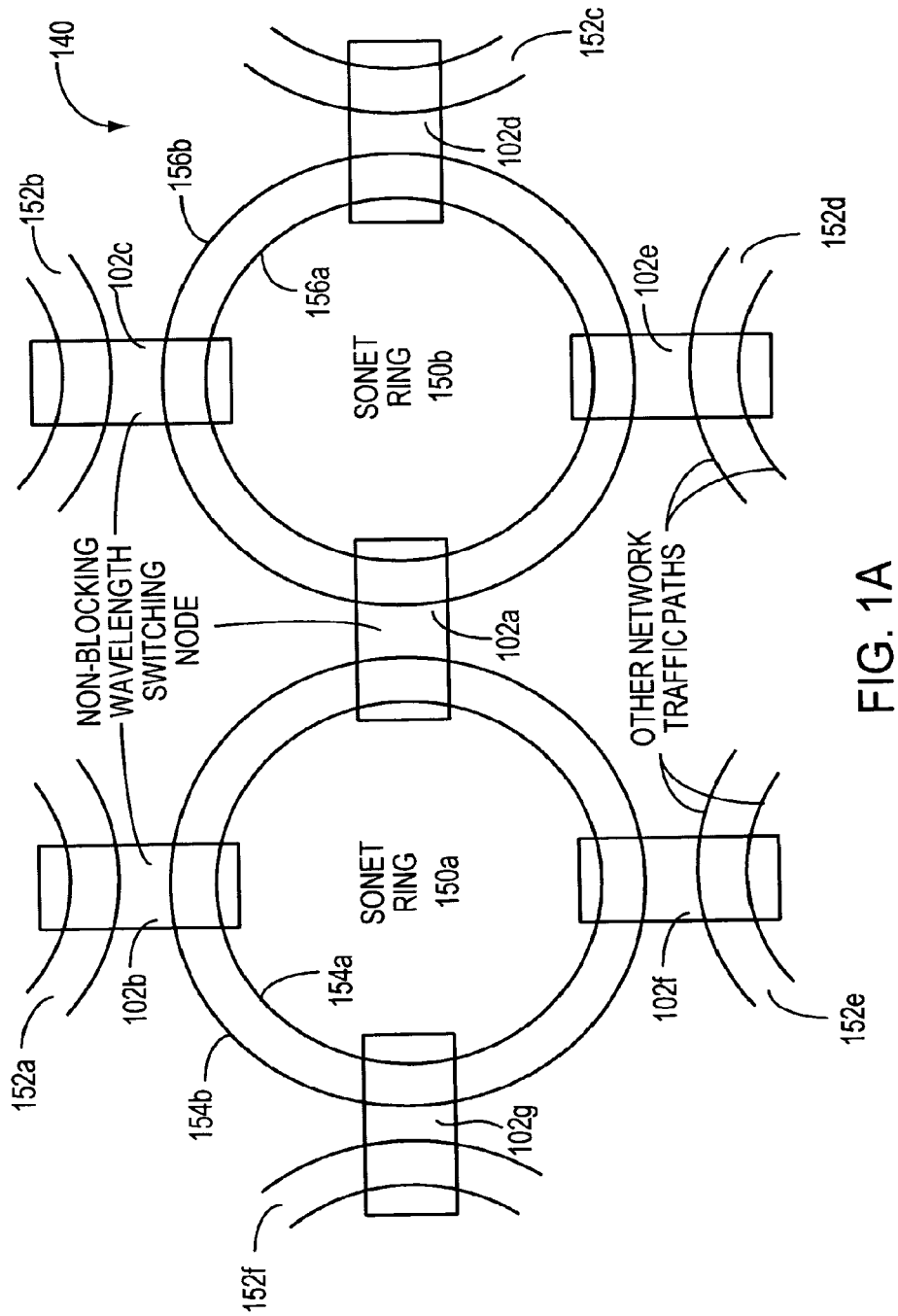
FIG. 1A shows an embodiment of a non-blocking wavelength switching node deployed in an exemplary network architecture.

FIG. 1A shows an embodiment of a non-blocking wavelength switching node 102a deployed in a possible network architecture 140 utilizing SONET rings 105a-b. The non-blocking wavelength switching node 102a is coupled to inner ring 154a and outer ring of SONET ring 150a and also to inner ring 156a and outer ring 156b of SONET ring 150b. Consequently, non-blocking wavelength switching node 102a can switch optical signals between any of these paths 154a-b, 156a-b. For example, an optical signal may be switched from inner ring 154a to the outer ring 154b of SONET ring 150a. As another example, an optical signal may be switched from inner ring 154a to either inner ring 156a or outer ring 156b of SONET ring 150b. FIG. 1A also shows additional non-blocking wavelength switching nodes 102b-g coupled to SONET rings 150a-b and also to other network traffic paths 152a-f. The other network traffic paths 152a-f may be, for example, other SONET rings or network terminal ends. The architecture 140 shown in FIG. 1A is only one possible architecture in which the non-blocking wavelength switching nodes 102a-g may be used. Other possible architectures include, but are not limited to, unidirectional path switched rings (UPSR), bidirectional lane switched rings (BLSR), MESH networks, and stacked rings.

Figure 1B:
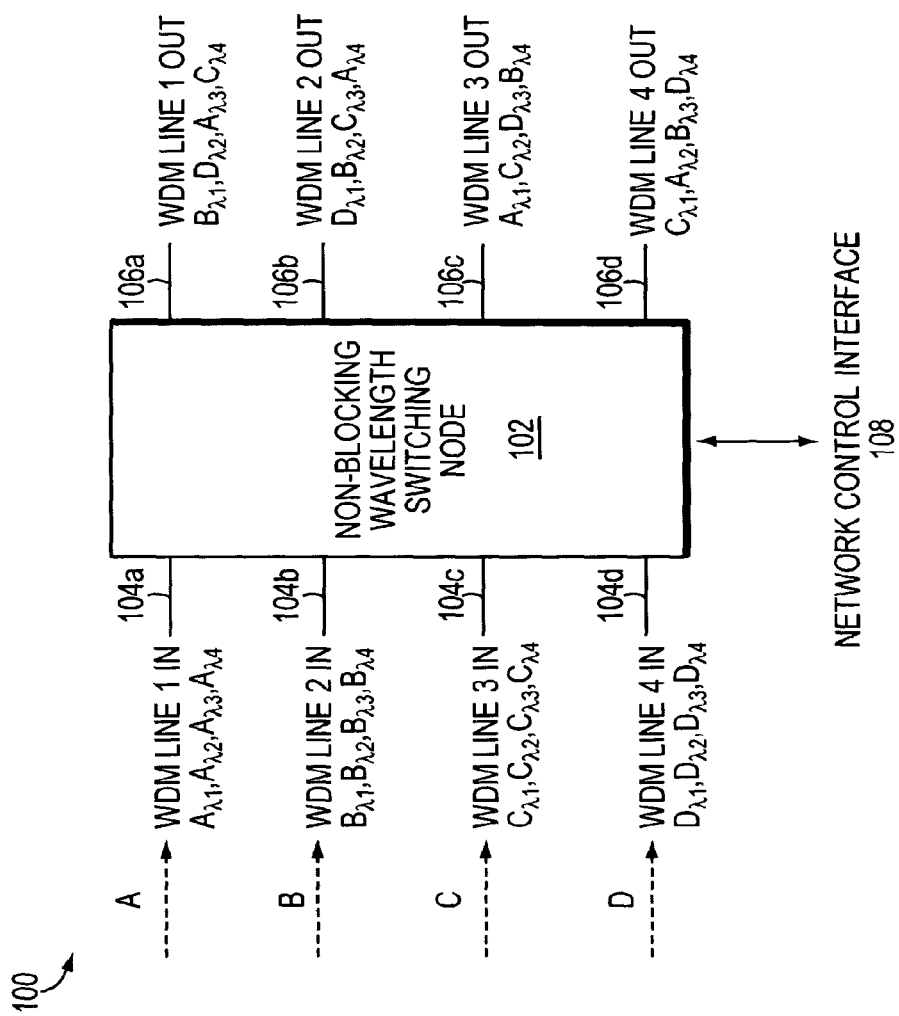
FIG. 1B shows an embodiment of a non-blocking wavelength switching node.

FIG. 1B is a block diagram of a network wavelength switching node architecture 100. The architecture 100 includes a number of input fibers 104a-d, output fibers 106a-d, a non-blocking wavelength switching architecture 102, and a network control and monitoring interface 108. Each input fiber 104a-d and output fiber 106a-d carries Wavelength Division Multiplex (WDM) traffic signals A, B, C, D. The input and output fibers 104a-d, 106a-d are connected via switching in the non-blocking wavelength switching node 102 that allows the input fiber 104a-d traffic WDM signals to be individually switched, typically according to wavelength, to the output fibers 106a-d.

By example only, FIG. 1B shows the WDM input lines 104a-d carrying respective WDM optical signals A, B, C, and D. Each WDM optical signal is carrying four optical signals, each signal being carried by a different wavelength. For example, WDM optical signal A is carrying optical signals $A_{\lambda 1}$, $A_{\lambda 2}$, $A_{\lambda 3}$, and $A_{\lambda 4}$. Likewise, WDM optical signal B is carrying optical signals $B_{\lambda 1}$, $B_{\lambda 2}$, $B_{\lambda 3}$, and $B_{\lambda 4}$. In FIG. 1B, similar wavelength notation is intended to indicate the same wavelength of light. For example, $A_{\lambda 1}$, $B_{\lambda 1}$, $C_{\lambda 1}$, and $D_{\lambda 1}$ represent four different optical signals that are being carried on different WDM lines 104a-d but each using the same wavelength, λ1, of light.

Within non-blocking wavelength switching node 102, the WDM optical signals A, B, C, and D, are split apart and then reconstituted as new WDM optical signals, which are then transmitted over WDM output lines 106a-d. For example, WDM output line 106a is carrying $B_{\lambda 1}$, $D_{\lambda 2}$, $A_{\lambda 3}$, and $C_{\lambda 4}$. The new WDM signals on WDM output lines 106a-d in FIG. 1B merely represent one possible rearrangement of optical signals. The only constraint on rearranging signals is that each WDM optical signal may only include a single signal at a given wavelength because carrying more than one optical signal at one wavelength may result in interference.

The traffic switching is achieved using Wavelength Selective Switches (WSSs) with blocking functionality. Blocking means that the WSS can block any of the wavelengths carried in the WDM optical signal. The blocking may be performed within each WSS or by using wavelength blocking technologies known in the art, e.g., liquid crystal blockers or array waveguide gratings with switches, coupled to each WSS. The term "blocking WSS," as used herein, is intended to cover blocking with the WSS and blocking performed in external optical components coupled to the WSS. A 1×N WSS has one input fiber port and N output fiber ports. The WSS switches traffic signals that are in a Wavelength Division Multiplexed (WDM) format where each of the different traffic signals is transmitted using a laser with a different wavelength (i.e., a different color) of light so that their information can be separated at the other end of the network. Current generation WSSs typically can switch from 40 or 80 wavelengths in the C- or L-Band of the transmission spectrum. The WSS allows for strictly non-blocking switching of any individual input WDM signal to any of the output fiber ports. More than one wavelength of an input WDM signal can be sent to an output fiber. For example, all of the input WDM signals can be sent to any of the output ports or any combinations of input signals of different wavelengths may be sent to the different output ports. The WSS also has the ability to block any input WDM signals. That is where one or more of the input signals can be blocked from going to any output fiber port. Another feature of the WSS is that it is completely bi-directional so that the N output ports can be used as inputs. In this case the WSS can send any combination of the WDM signals on the N input ports to the one output port and also block any desired WDM signals. Note that two or more optical traffic signals at the same wavelength cannot be combined on an output fiber since this would cause interference that degrades or destroys the integrity of the transmission signals.

Figure 1C:
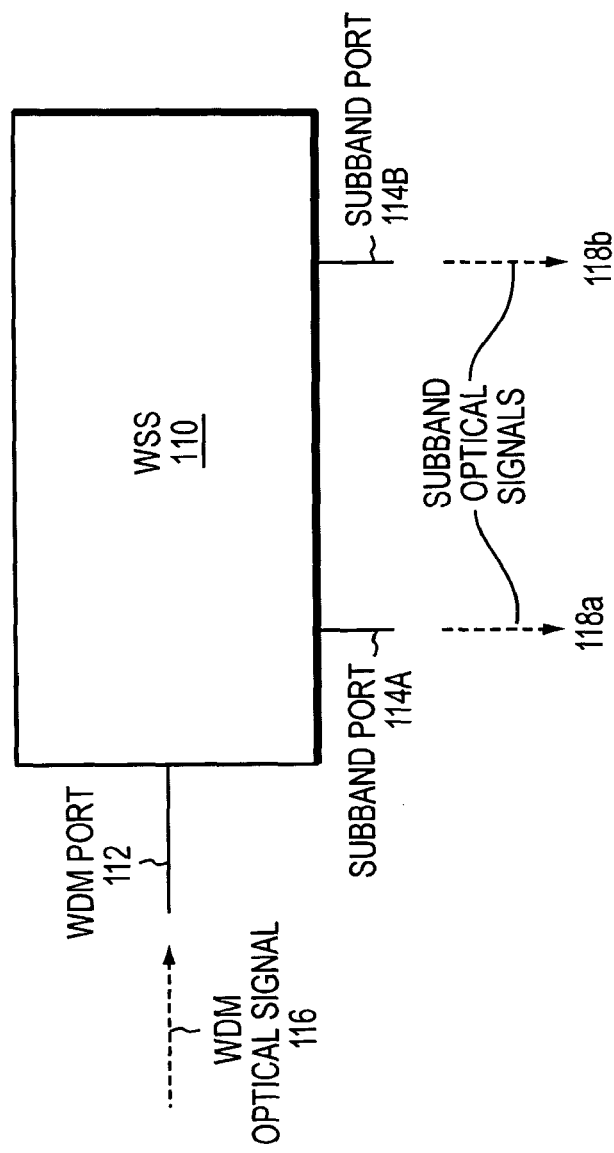
FIG. 1C shows an embodiment of a Wavelength Selective Switch (WSS) being used in a first direction in a non-blocking wavelength switching node.
Figure 1D:
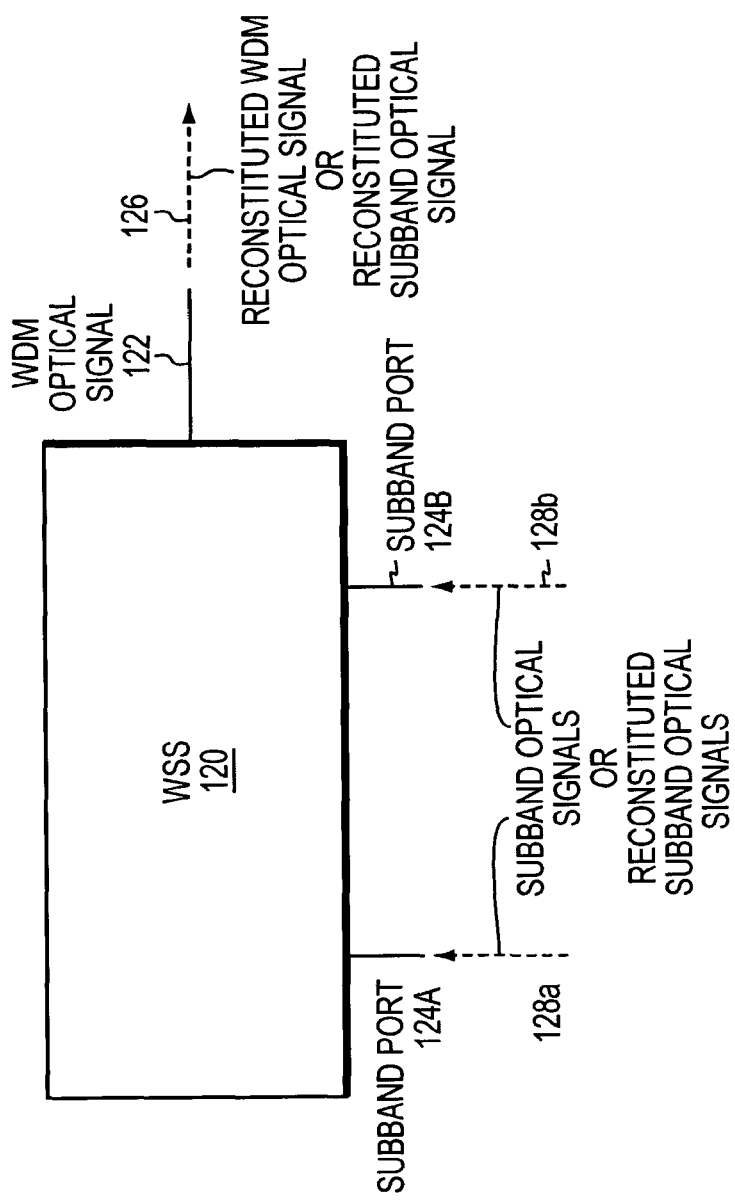
FIG. 1D shows an embodiment of a WSS being used in a second direction in a non-blocking wavelength switching node.

FIGS. 1C and 1D illustrate 1×2 WSSs 110, 120 being used in a first direction and then in the opposite direction, respectively. For clarity in this application, terms that will be used throughout the remainder of this application will be defined with respect to FIGS. 1B and 1C. These terms are not intended to exclude other terminology that may be used in the industry to describe components or signals.

FIG. 1C shows a 1×2 WSS 110 in which port 112 is receiving WDM signal 116. Therefore, port 112 will be called a WDM port. A WDM signal, for the purposes of this application, is defined as an optical signal carrying the full compliment of wavelengths carried by optical signals entering the non-blocking wavelength switching node 102. The WSS 110 has two subband ports 114a-b outputting subband optical signals 118a-b. A subband optical signal, for the purposes of this application, is an optical signal carrying a subset of the full complement of wavelengths carried by optical signals entering the non-blocking wavelength switching node 102. Please note that WSSs are capable of sending to an output port the full complement of wavelengths, which, for the purposes of this application, would still be defined as a subband optical signal.

FIG. 1D shows a 1×2 WSS 120 in which ports 124a-b are receiving respective subband optical signals 128a-b. Subband optical signal 128a is different from subband optical signal 128b. Alternatively, subband optical signals 128a-b may be reconstituted subband optical signals. A reconstituted subband optical signal, for the purposes of this application, is an optical signal resulting from the combination of two or more subband optical signals that is only carrying a subset of the full complement of wavelengths carried by optical signals leaving the non-blocking wavelength switching node 102. The difference between a subband optical signal and a reconstituted subband optical signal will be further described in the later discussion of FIGS. 4B-C and 5B-C. WSS 120 also has port 122 outputting either a reconstituted subband optical signal or a reconstituted WDM optical signal 126. A reconstituted WDM signal, for the purposes of this application, is an optical signal resulting from the combination of two or more reconstituted subband signals that is carrying the full compliment of wavelengths carried by optical signals leaving the non-blocking wavelength switching node 102. Note that in many instances, the reconstituted WDM optical signals leaving the non-blocking wavelength selective switching node 102 will carry the same set of frequencies, e.g., forty wavelengths, as the WDM optical signals entering the non-blocking wavelength selective switch 102. However, certain wavelengths from a WDM optical signal may be purposely blocked and would therefore be absent from the reconstituted WDM signal. It is also important to realize that the definitions provided above merely define order of operation rather than number of wavelengths carried by an optical signal. For example, two subband optical signals may by combined to form a reconstituted subband optical signal. However, certain wavelengths of light may be blocked from each subband optical signal, resulting in a reconstituted optical signal having the same number of optical wavelengths as either subband optical signal from which it is made.

Figure 2:
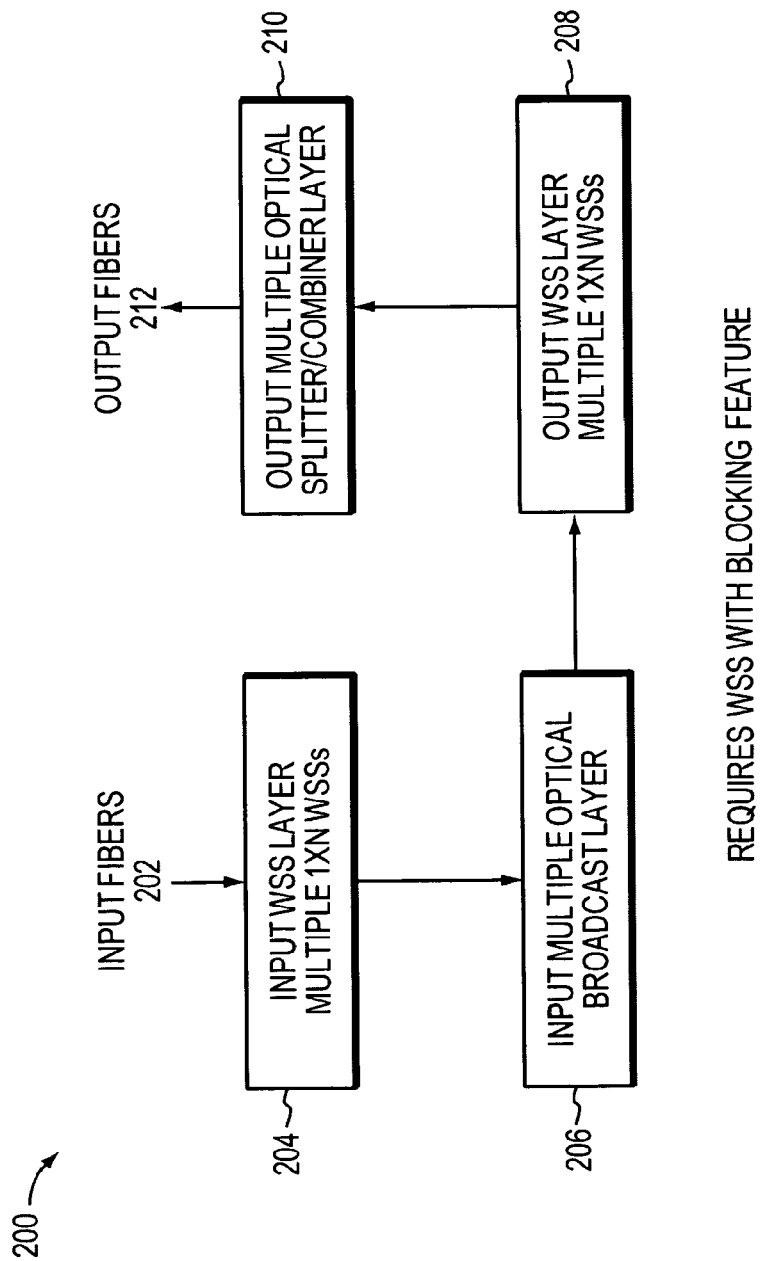
FIG. 2 shows a flow diagram of an embodiment of a scalable wavelength switching node with intermediate broadcast layer.

FIG. 2 is a flow diagram illustrating basic architecture 200 of an embodiment of the invention. In an example configuration, input fibers 202 feed WDM signals to multiple WSSs 204. The WSSs 204 then feed subband optical signals to a subnet broadcast layer 206 that broadcasts each subband optical signal. A subnet broadcast is a broadcast that only reaches a subset of the available output paths. Each broadcast subband optical signal is combined with other subband optical signals within WSSs 208 to form reconstituted subband optical signals. The reconstituted subband optical signals are then further combined with other reconstituted subband optical signals at a splitter/combiner layer 210 to form reconstituted WDM optical signals, which are transmitted over output fibers 212.

Figure 3:
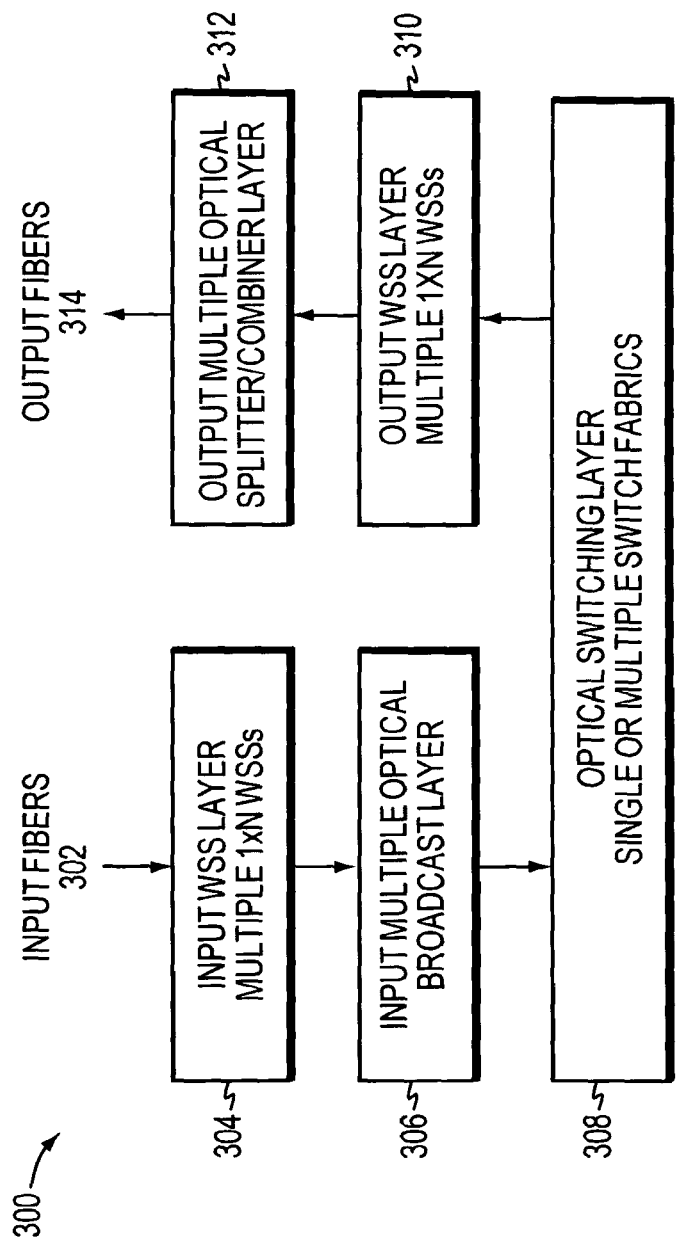
FIG. 3 shows a flow diagram of an embodiment of a scalable wavelength switching node with intermediate broadcast layer and optical switching layer.

FIG. 3 is a flow diagram illustrating how an optical switch layer 308 can be added to increase the flexibility of the architecture 300. This architecture is similar to that in FIG. 2 with similar input WSS layer 304 and output multiple optical splitter/combiner layer 312, except that a single large non-blocking matrix switch 308 or smaller fiber subgroup of switches (not shown) is placed between the optical broadcast layer 306 and output WSS layer 310. This increases flexibility and robustness of the overall architecture by giving an extra layer of switching for dynamic traffic switching, network and node protection switching, and network and node diagnostics. The optical switching layer allows signals to switch around component failures (e.g., fiber, splices, connectors, couplers, WSSs, etc.). The optical switch can also be used to connect the node and network into diagnostic equipment for installation, provisioning, routine monitoring, and fault location.

The 1×N WSSs assumed in this example architecture have an ability to transmit or block any of the WDM traffic signals on the input fiber. The transmitted WDM signals can be switched to any of the WSS output fibers. The example N×1 WSSs likewise have an ability to transmit or block any of the input traffic signals. Any of the input WDM traffic signals can be switched to the output fiber with the constraint that, using today's optical signaling protocols, only one WDM signal at a fixed wavelength from the N×1 WSS inputs can be switched to the output fiber. Different signaling protocols, technology, or transmission formats, such as orthogonal polarization launch, may support switching more than one optical signal at a given wavelength on the same optical path. The present invention would work identically under such different transmission formats.

Figure 4A:
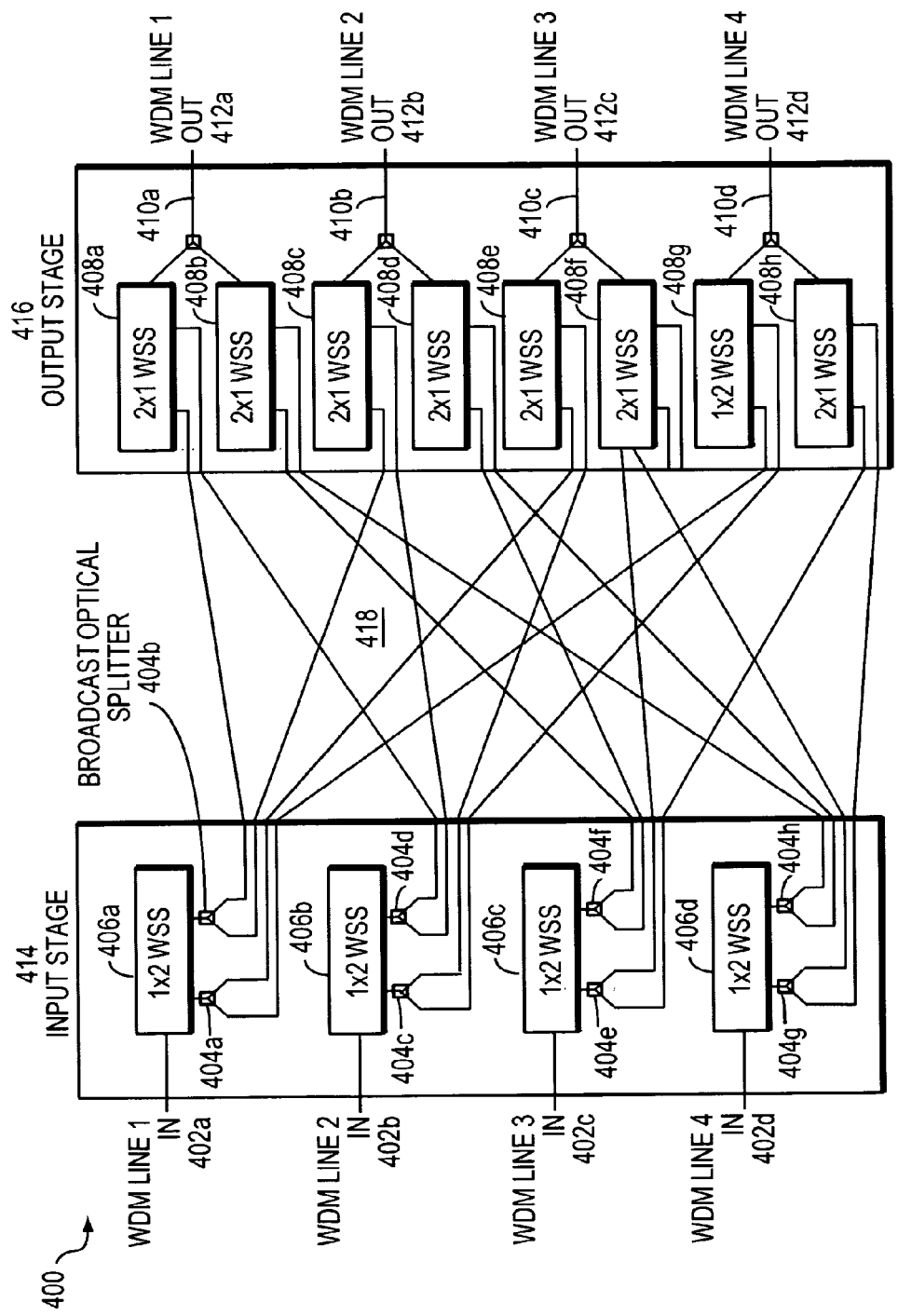
FIG. 4A shows an embodiment of a non-blocking wavelength selective switching node comprising 1×2 WSSs and Broadcast Splitters.

FIG. 4A is a high level schematic diagram illustrating an example of an architecture 400 using 1×2 WSSs 406a-d, 408a-h, and 1:2 splitters 404a-h, 410a-d. This architecture 400 assumes bi-directional WSSs 406a-d, 408a-h where they can be used in 1×N (1 input and N outputs) or N×1 (N inputs×1 output) configurations. The node architecture 400 may include input WDM traffic lines 402a-d, an input stage 414, output stage 416, and output WDM traffic lines 412a-d. Note that such a node could be asymmetric, utilizing a number of input WDM traffic lines 402a-d different from the output WDM traffic lines 412a-d. Also note that different sizes of WSSs 406a-d, 408a-h may be mixed in the input stages 414 and output stages 416. Finally, note that while FIG. 4 illustrates an example node architecture 418 in which the input stage and output stage are optically coupled with fixed lines, optical switches could be used to increase flexibility of the architecture.

Continuing to refer to FIG. 4A, in one embodiment, the WDM traffic channels from each input fiber 402a-d are first switched by the input WSSs 406a-d to subnet broadcast splitters 404a-h that are connected to appropriate destination output fibers 418. As previously noted, subnet broadcast means a broadcast that only reaches a subset of outputs of the node. For example, optical splitter 404b in FIG. 4A only broadcasts to node outputs 412a and 412b via WSSs 408a and 408c. Therefore, optical splitter 404b is a subnet broadcast splitter. Note that while FIG. 4A shows uniform use of 1:2 splitters 404a-h, different sized splitters could be mixed within the same node architecture 400. In some embodiments, all of the WDM channels intended for a particular set of output fibers connected to a subnet broadcast splitter 404a-h are routed to the same WSS output. The subnet broadcast splitters 404a-h then broadcast the WDM traffic signals to multiple output fiber stages, including the intended destination fibers 418. The WSSs 408a-h in the output stage 416 associated with an output fiber then pass the WDM channels intended for that output fiber and block all other channels intended for other output fibers. Finally, the WDM channels from each output WSS 408a-h associated with an output fiber 412a-d are combined using an optical combiner 410a-d on an output fiber 412a-d. Note that while FIG. 4 illustrates uniform use of 1:2 combiners, different sized combiners could be mixed within the same node architecture. This non-blocking wavelength switch architecture allows any wavelength from any input fiber to be switched in a non-blocking way without disturbing any of the other traffic signal connections to any output fiber. Alternatively, the architecture allows wavelength blocking if desired.

Figure 4B:
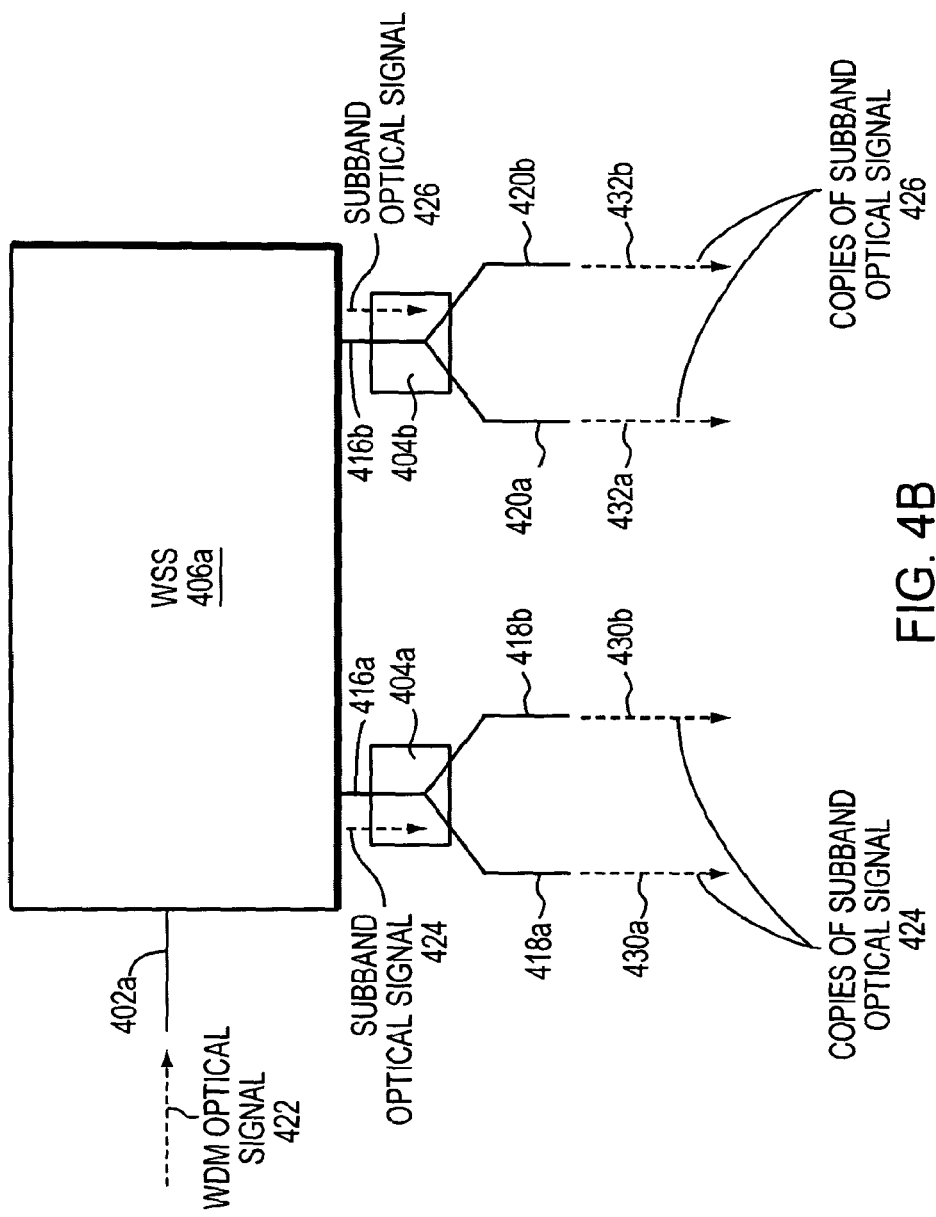
FIG. 4B shows a WSS and coupled splitters from the input stage of the non-blocking wavelength switching node of FIG. 4A.

FIG. 4B shows greater detail of WSS 406a from the input stage 414 of node architecture 400, shown in FIG. 4A. WSS 406a is receiving WDM optical signal 422 at WDM port 402a. Within the WSS 406a, the WDM optical signal 422 is divided into subband optical signals 424, 426, each carrying a subset of the wavelengths comprising the WDM optical signal 422. Subband optical signals 424, 426 are output from respective subband ports 416a-b. Then, each subband optical signal 424, 426 is split into identical parts by subnet broadcast splitters 404a-b. For example, subband optical signal 424 is split into identical subband optical signals 430a-b by subnet broadcast splitter 404a and then output from subnet broadcast splitter 404a on splitter outputs 418a-b. Likewise, subband optical signal 426 is split into identical subband optical signals 432a-b by subnet broadcast splitter 404b and then output from subnet broadcast splitter 404b on splitter outputs 420a-b.

Figure 4C:
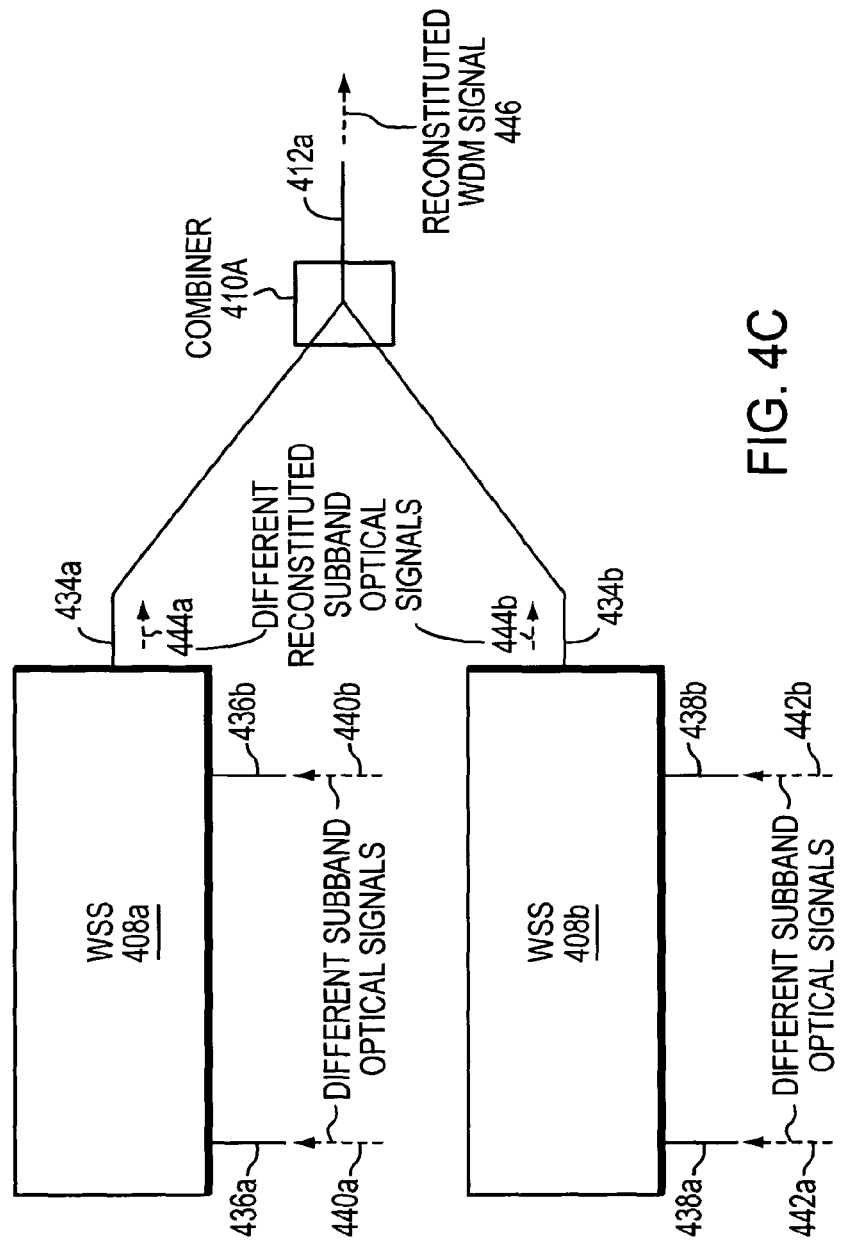
FIG. 4C shows WSSs and coupled splitter from the output stage of the non-blocking wavelength switching node of FIG. 4A.

FIG. 4C shows greater detail of WSSs 408a-b from the output stage 416 of node architecture 400 shown in FIG. 4A. WSSs 408a-b each have two subband ports 436a-b, 438a-b. Each subband port is receiving a different subband optical signal 440a-b, 442a-b. Within each WSS 408a-b, subband optical signals 440a-b, 442a-b are combined to form reconstituted subband optical signals 444a-b. For example, subband optical signals 440a-b are combined in WSS 408a to form reconstituted subband optical signal 444a. Likewise, subband optical signals 442a-b are combined in WSS 408b to form reconstituted subband optical signal 444b. The reconstituted subband optical signals 444a-b are then output from respective ports 434a-b and then combined within combiner 410a to form reconstituted WDM signal 446, which is transmitted over combiner 410a output 412a.

Figure 4D:
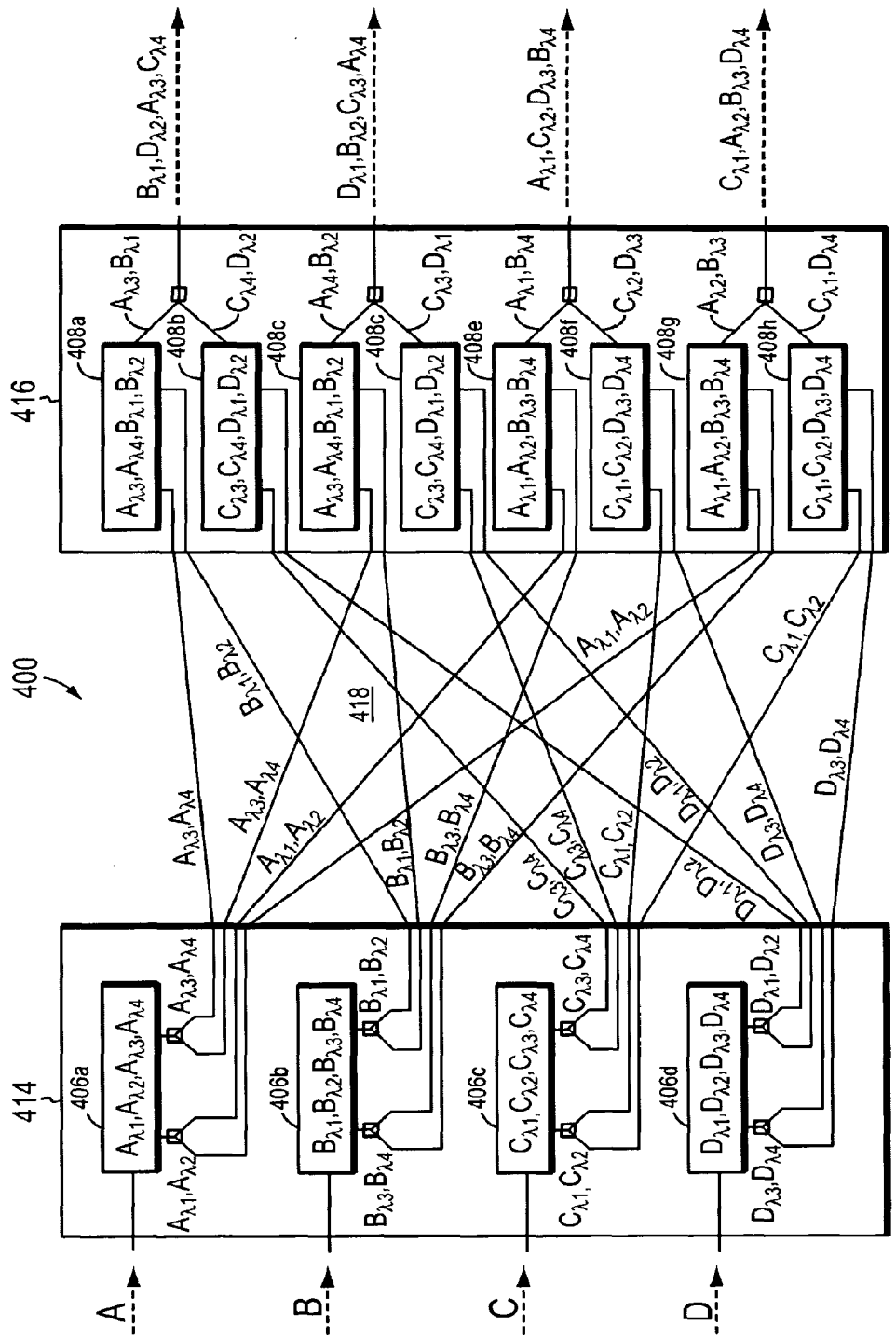
FIG. 4D shows the non-blocking wavelength switching node of FIG. 4A with an example flow of optical traffic signals through the non-blocking wavelength switching node.

FIG. 4D illustrates node architecture 400 of FIG. 4A with most reference numbers and labels removed, for clarity, and wavelength notation added to illustrate the following simple example of optical signal flow through non-blocking wavelength switching node architecture 400. FIG. 4D shows four WDM optical signals, labeled "A," "B," "C," and "D," entering four WSSs 406a-d at the input stage 414. Each WDM optical signal carries four traffic channels, each at a different wavelength of light: $\lambda_1$, $\lambda_2$, $\lambda_3$, and $\lambda_4$. For example, WDM optical signal "A" comprises $A_{\lambda 1}$, $A_{\lambda 2}$, $A_{\lambda 3}$, and $A_{\lambda 4}$. Within each WSS 406a-d of the input stage 414, respective WDM optical signals are divided into subband optical signals. For example, WDM signal "A" is divided into a subband optical signal carrying $A_{\lambda 1}$ and $A_{\lambda 2}$, and a subband optical signal carrying $A_{\lambda 3}$, and $A_{\lambda 4}$. Each subband optical signal is then split into multiple identical copies and transported to WSSs 408a-h of the output stage 416. Within each WSS 408a-h of the output stage 416, different subband optical signals from different input stage 414 WSSs 406a-d are combined to form reconstituted subband optical signals. For example, WSS 408a receives $A_{\lambda 3}$, $A_{\lambda 4}$, $B_{\lambda 1}$, and $B_{\lambda 2}$. WSS 408a blocks $A_{\lambda 4}$ and $B_{\lambda 2}$, only combining $A_{\lambda 3}$ and $B_{\lambda 1}$ into a reconstituted subband optical signal. Likewise, WSS 408b receives $C_{\lambda 3}$, $C_{\lambda 4}$, $D_{\lambda 1}$, and $D_{\lambda 2}$. WSS 408b then blocks $C_{\lambda 3}$ and $D_{\lambda 1}$, only combining $C_{\lambda 4}$ and $D_{\lambda 2}$ into a reconstituted subband optical signal. The reconstituted subband optical signals of each output stage 416 WSS 408a-h are then combined with the reconstituted subband optical signals of certain other output stage 416 WSSs 408a-h to form reconstituted WDM optical signals. For example, the $A_{\lambda 3}$, $B_{\lambda 1}$ reconstituted subband optical signal from WSS 406a is combined with the $C_{\lambda 4}$, $D_{\lambda 2}$ reconstituted subband optical signal from WSS 406b to form a reconstituted WDM optical signal comprising $B_{\lambda 1}$, $D_{\lambda 2}$, $A_{\lambda 3}$, and $C_{\lambda 4}$. A person having ordinary skill in the art would understand that the optical signals from the input stage may be rearranged in any combination on the output stage by merely rearranging the division of WDM optical signals at input stage 414 WSSs 406a-d and by reconfiguring the destination output fibers 418. Further rearrangement to switch around faults within the node or the external transmission system may be accomplished using an optical switching layer 308 in place of the destination output fibers 418. An optical switching layer 418 also enables rearrangement of wavelength blocking between input and output fibers in a blocking version of the wavelength switching node.

This novel WSS node architecture allows scaling of a network wavelength switch node to sizes beyond standard N outputs of fixed 1×N WSSs. The node can be initially built with only the hardware associated with the initial traffic requirements and grow "hitlessly," that is, new equipment can be added as traffic grows without disturbing existing traffic, thus supporting much larger node fiber counts than are traditionally handled by 1×N WSSs. This flexibility is a useful benefit to network designers to keep initial deployment costs to a minimum while at the same time designing nodes to scale to as large a size as necessary. Note that the subnet broadcast feature can also be used to create multiple copies of the traffic signals to broadcast them to multiple locations if desired.

Figure 5A:
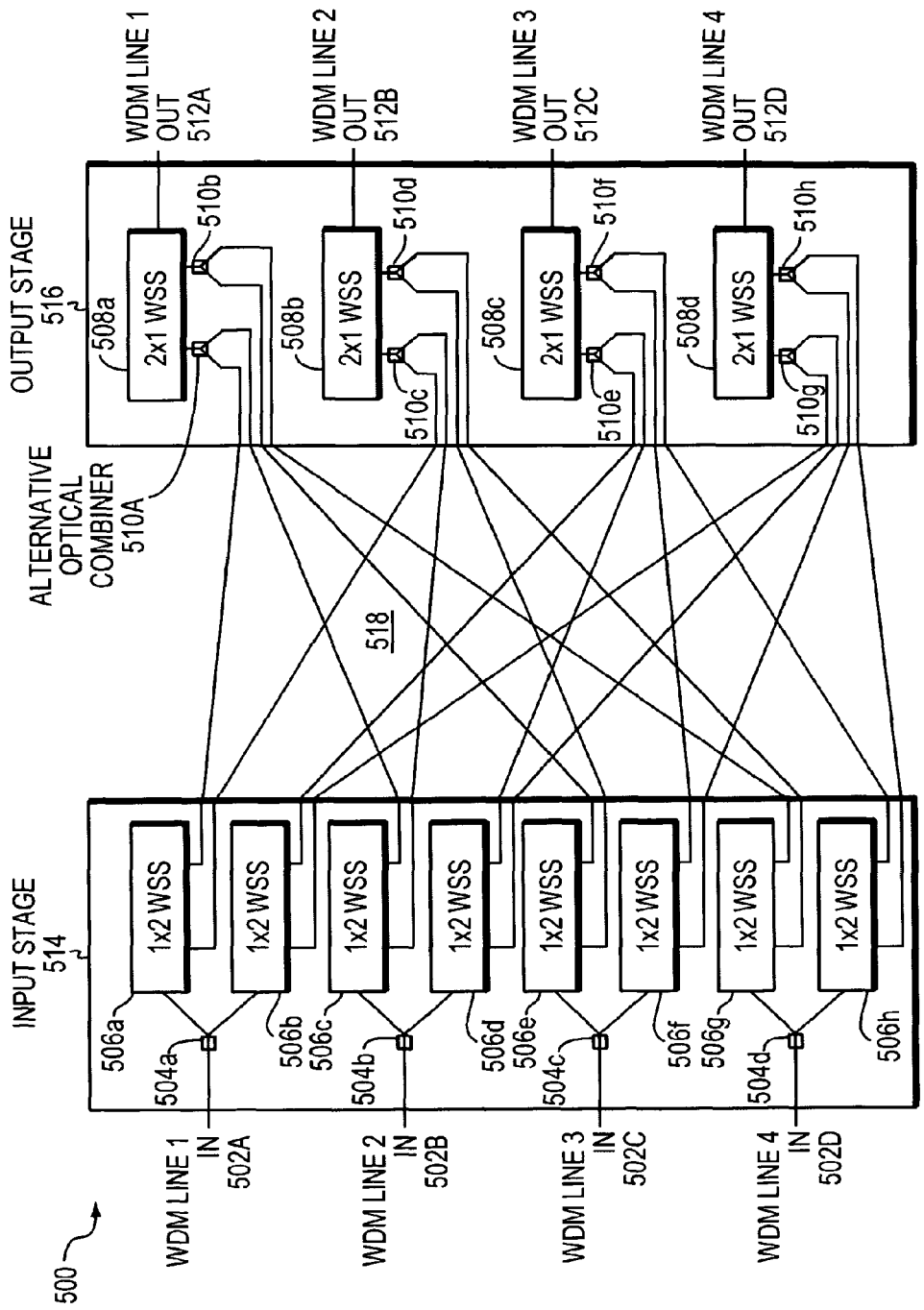
FIG. 5A shows an embodiment of a non-blocking wavelength selective switching node comprising 1×2 WSSs and Optical Combiners.

FIG. 5A is another high level schematic diagram showing an alternative implementation 500 that mirrors the example architecture of FIG. 4. In this implementation 500, the architectures of the input stage 514 and output stage 516 shown in FIG. 4A are reversed. Since all the components are bidirectional, this mirror-image implementation is equivalent to that of FIG. 4A. Here, the signals are split using splitters 504a-d at the inputs 502a-d and broadcast to multiple WSSs 506a-h that pass or block the signals. The output stage 516 then combines the WDM traffic channels from various inputs using splitters 510a-h and WSSs 508a-d to select the signals to put onto the output fibers 512a-d.

Figure 5B:
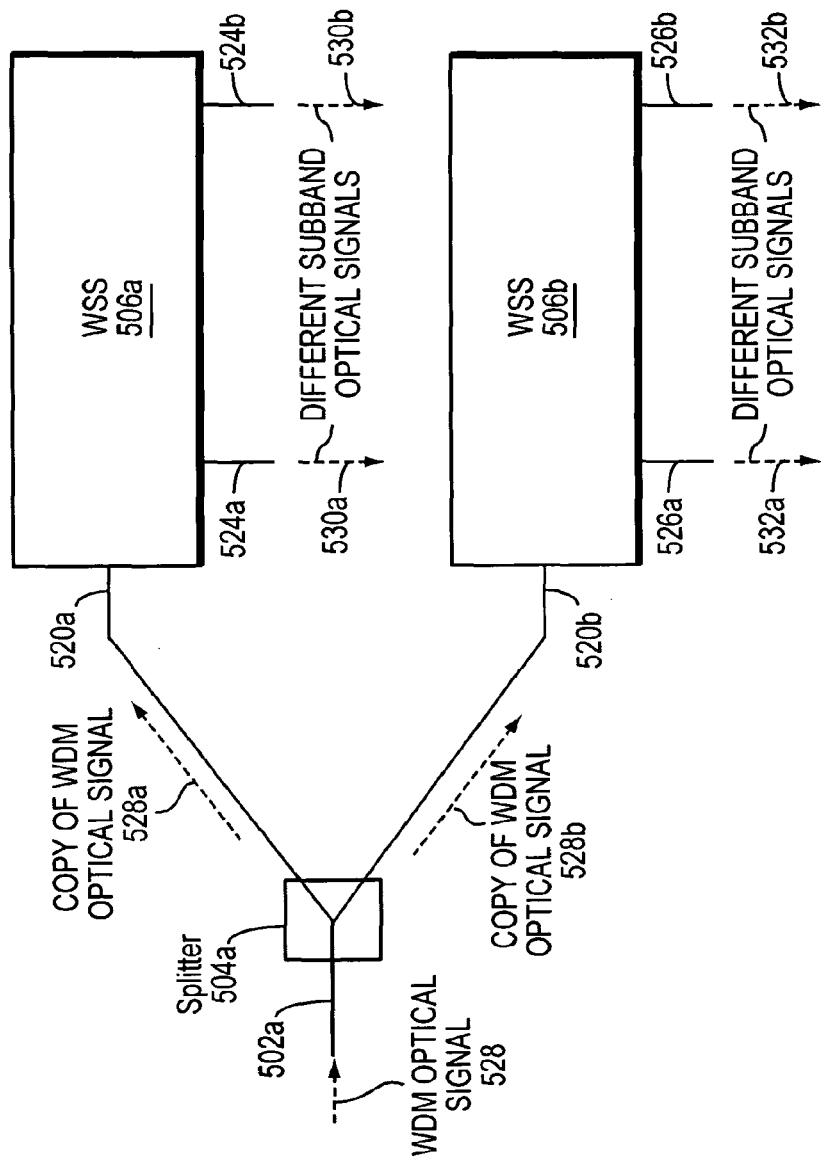
FIG. 5B shows WSSs and coupled splitter from the input stage of the non-blocking wavelength switching node of FIG. 5A.

FIG. 5B shows greater detail of WSSs 506a-b from the input stage 514 of node architecture 500 shown in FIG. 5A. WDM optical signal 528 is split by splitter 504a into identical WDM optical signals 528a-b. WDM ports 520a-b on respective WSSs 506a-b receive respective WDM optical signals 528a-b. Within each WSS 506a-b, respective WDM optical signals are divided into respective subband optical signals 530a-b, 532a-b, each carrying a subset of the wavelengths comprising the WDM optical signals 528a-b. Subband optical signals 530a-b, 532a-b are then output from respective subband optical ports 524a-b, 526a-b.

Figure 5C:
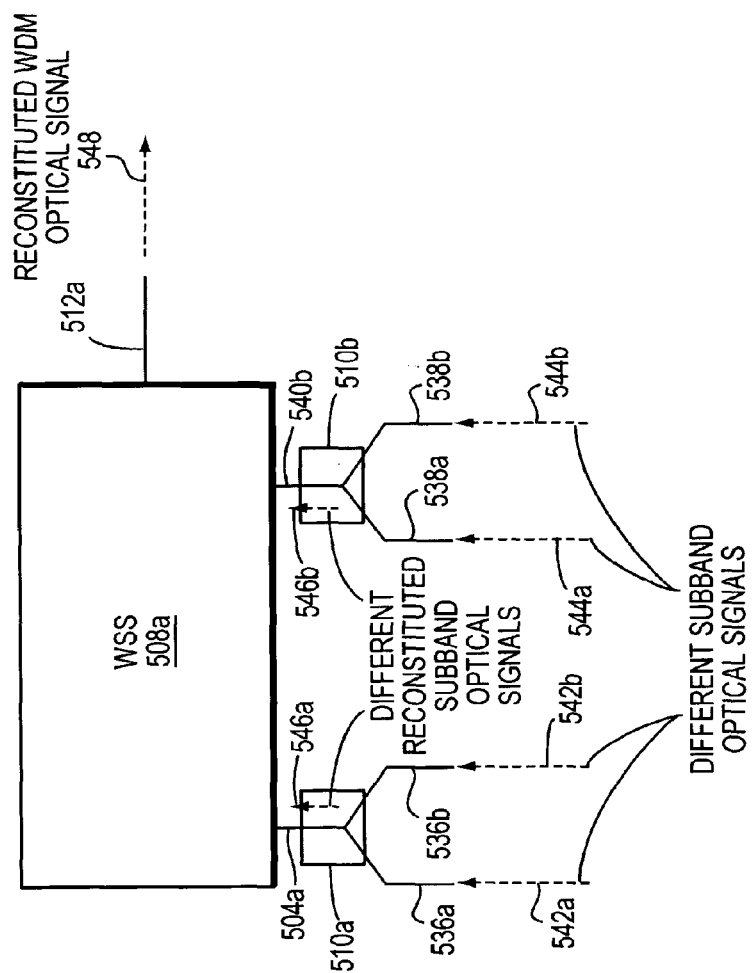
FIG. 5C shows a WSS and coupled splitters from the output stage of the non-blocking wavelength switching node of FIG. 5A.

FIG. 5C shows greater detail of WSS 508a from the output stage 516 of node architecture 500 shown in FIG. 5A. Different subband optical signals 542a-b, 544a-b are combined within respective combiners 510a-b to form reconstituted subband optical signals 546a-b. Reconstituted subband optical signals 546a-b are then received by WSS 508a by respective subband ports 540a-b. Within WSS 508a, reconstituted subband optical signals 546a-b are combined to form reconstituted WDM optical signal 548, which is output from WDM port 512a.

Figure 6:
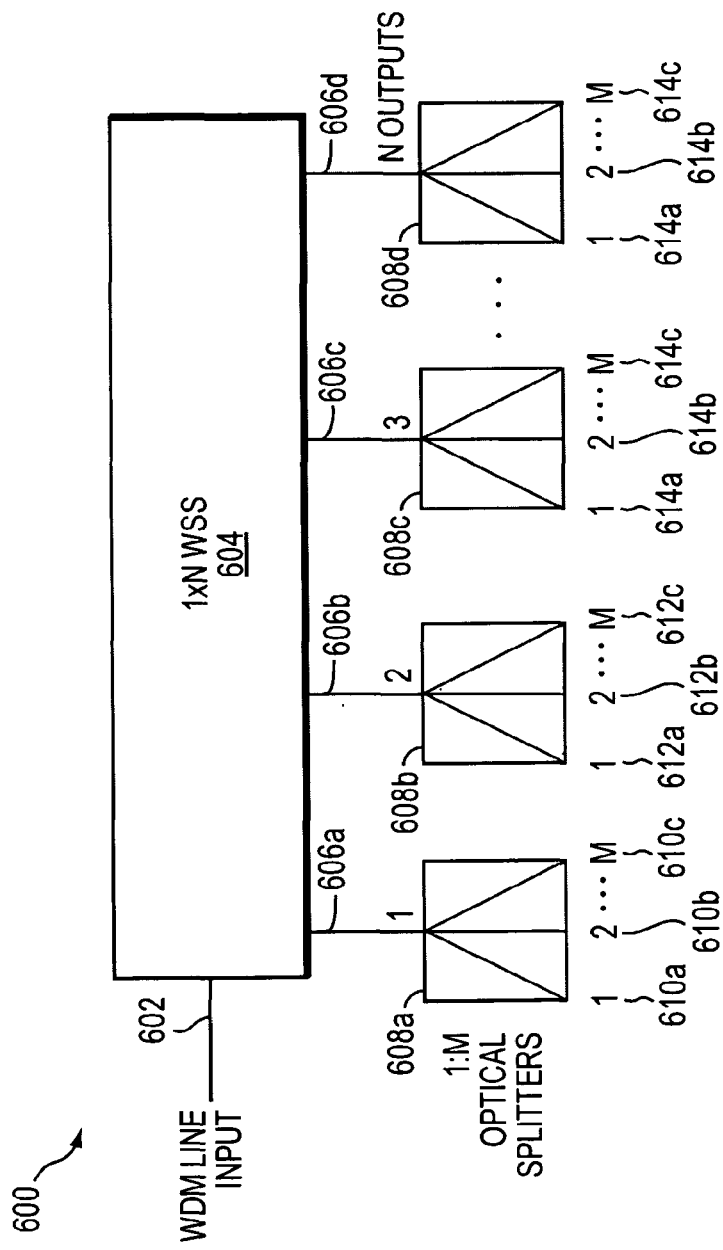
FIG. 6 shows the input stage broadcast architecture of the embodiment of FIG. 4.

FIG. 6 is a schematic diagram showing details of the input stage broadcast architecture 400, shown in FIG. 4A, using optical splitters 608a-d on each WSS output 606a-d. In this example implementation, a 1×N WSS, with one input 602 and N outputs 606a-d, is used. Each of the N outputs 606a-d has a splitter 608a-d, dividing each output signal into M identical parts. The total number of output line pairs L can be defined by:

$$L = M \times N,$$

where L is the number of output line pairs, N is the size of the WSS, and M is the size of the splitter. For example, the input stage WSSs 406a-d in FIG. 4A have two outputs, and the splitters 404a-h are two-way splitters. Therefore, there are a total of 4 output line pairs (L=M×N=2×2=4) for each WSS in the input stage. In a second example, if 75 line pairs are needed and 1:4 splitters are being used, then a WSS with a size of 19 (N=L/M=75/4=18.75, rounded up to the nearest integer) is needed. In a third example, if 75 line pairs are needed and WSSs with a size of 17 are to be used, then 1:5 splitters (M=L/N=75/17=4.41, rounded up to the nearest integer) are needed. Note that when solving L=M×N for either M or N, a fractional result is possible, and the WSS size, N, or splitter size, M, will usually be rounded up to the nearest integer. However, an architecture could incorporate mixed sizes of splitters/combiners or WSSs to precisely match the requirements of the system. For example, if 28 line pairs are needed and 1×8 WSSs are to be used, then the equation L=M×N states that splitters of size 3.5 are needed. Rather than rounding up and using 1:4 splitters, four of the WSS outputs could be coupled to 1:3 splitters and the remaining four WSS outputs could be coupled to 1:4 splitters. It is also worth noting that the optical splitters work in the opposite direction as combiners, combining M incoming signals into a single outgoing signal. In other words, a splitter, operated in the opposite direction, is a combiner.

Figure 7:
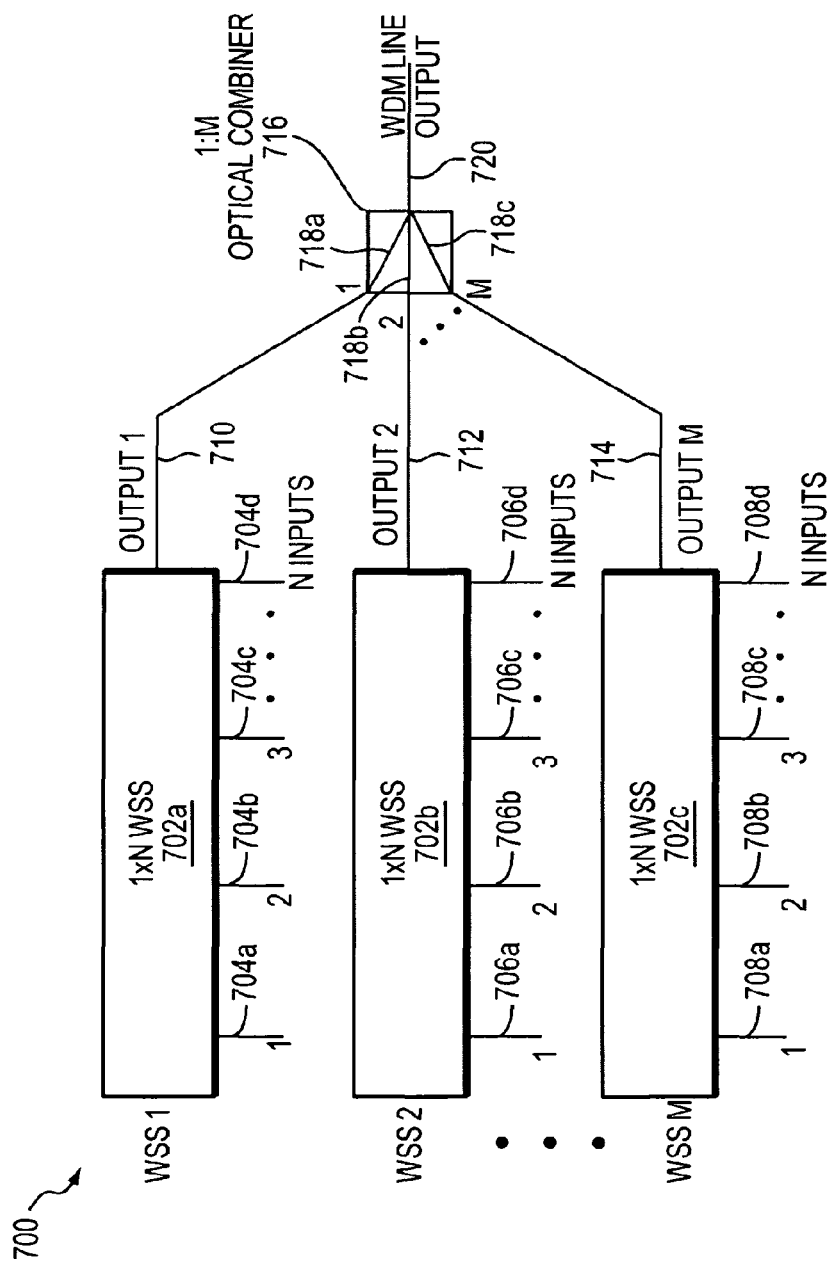
FIG. 7 shows the output stage selection/combiner architecture of the embodiment of FIG. 4.

FIG. 7 is a high level schematic diagram illustrating example details of the output stage broadcast architecture 400 using WSSs and couplers. In this example implementation, WSSs 702a-c are operated in the opposite direction from that of the input stage (i.e., multiple signals are being input into each WSS and multiplexed into a single output signal). Each of the output fibers from the splitters on the input stage are routed to one of the input fibers 704a-d, 706a-d, 708a-d on the WSSs 702a-c of the output stage. The output signals from several WSSs are combined by an optical combiner 716, resulting in a single optical signal exiting the output stage 720. In this example embodiment, the number of WSSs 702a-c in the output stage being combined together is equal to the size of each splitter 608a-d from the input stage shown in FIG. 6. In other words, if the size M of splitters 608a-d on the input stage WSSs 604 is 4, then the outputs of four WSSs 702a-c at the output stage are combined in the combiner of the output stage. As a result, each WDM line output is optically coupled to a total of M×N fibers from the broadcast splitters of the input stage.

Figure 8:
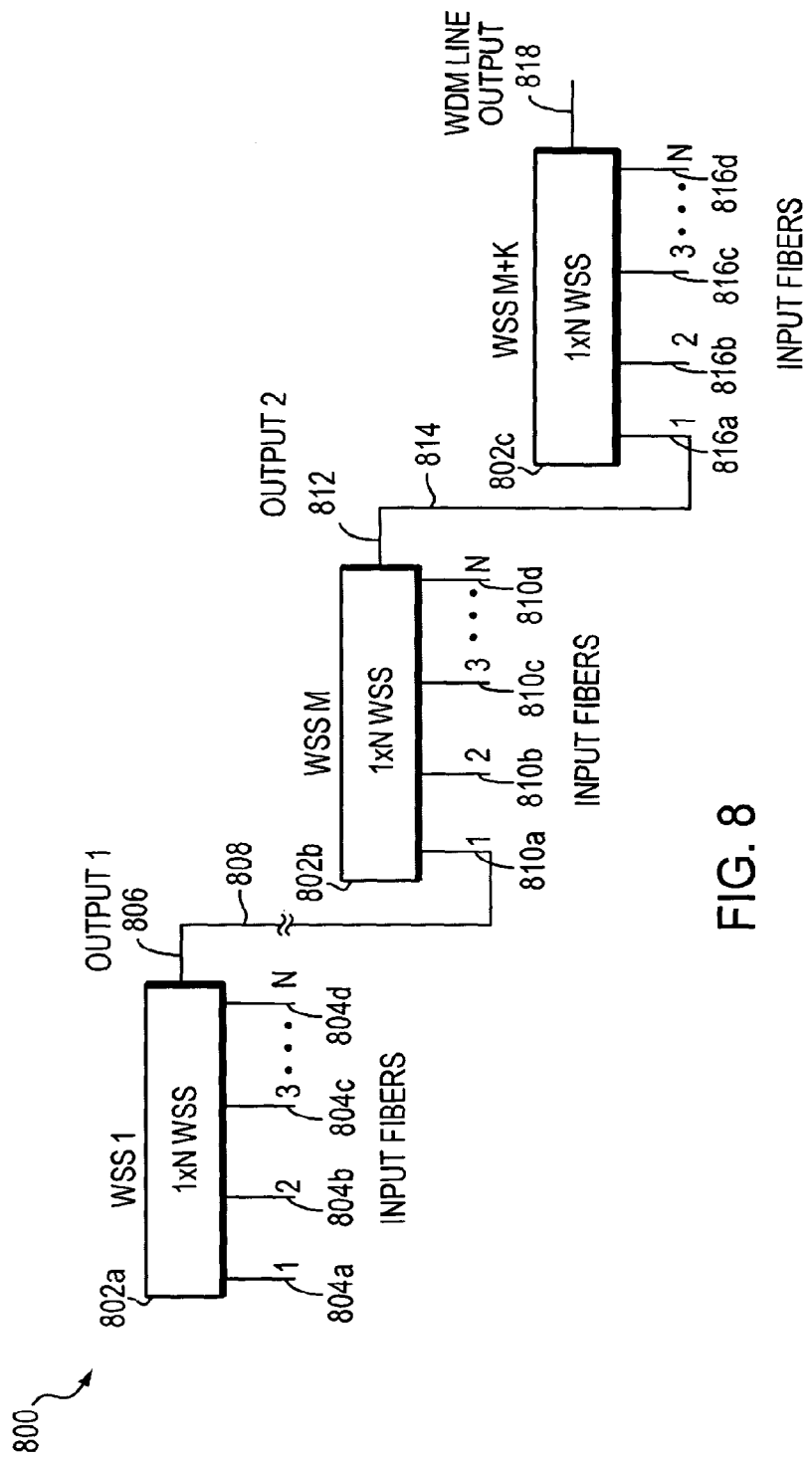
FIG. 8 shows an alternative embodiment of an output stage architecture without splitters using 1×N WSSs.

FIG. 8 is a high level schematic diagram that shows an alternative architecture 800 that combines cascaded WSSs 802a-c to eliminate use of splitters. In the architecture 800 illustrated in FIG. 8, N line pairs from the input stage are optically coupled to the inputs 804a-d of a first 1×N WSS 802a of the output stage. The single output 806 from the first 1×N WSS 802a is fed into an input 810a of a second 1×N WSS 802b, and the remaining inputs 810b-d of the second 1×N WSS 802b are optically coupled to line pairs from the input stage. This cascade configuration is continued with additional WSSs until the M×N line pairs from the input stage are all connected to the output stage. A greater number of WSSs are needed in the output stage to accommodate the M×N line pairs from the input stage than the splitter/combiner configuration illustrated in FIG. 7 because input lines of WSSs are used for coupling to other WSSs. The number of extra WSSs (over the M WSSs required by the coupler architecture of FIG. 7) K can be calculated by the following equation:

$$M \times N = L = N + (M-1)(N-1) + K(N-1)$$

which can be rearranged as:

$$K = \frac{(L-N)}{(N-1)} - \frac{L}{N} + 1$$

where L is the number of line pairs, N is the size of the WSSs, and K is the number of WSSs needed over the M WSSs needed in the architecture illustrated in FIG. 7. When using the equation above, the result K is rounded up to the next integer value and is usually either 1 or 2. The effective total number of input fibers 804a-d, 810a-d, 816a-d coupled to WDM output line 818 is N+(M+K−1)×(N−1). In addition to requiring additional WSSs, the architecture of FIG. 8 also presents equalization problems—the optical signal strength of different wavelengths varies depending on the number of WSSs through which they travel.

Figure 9:
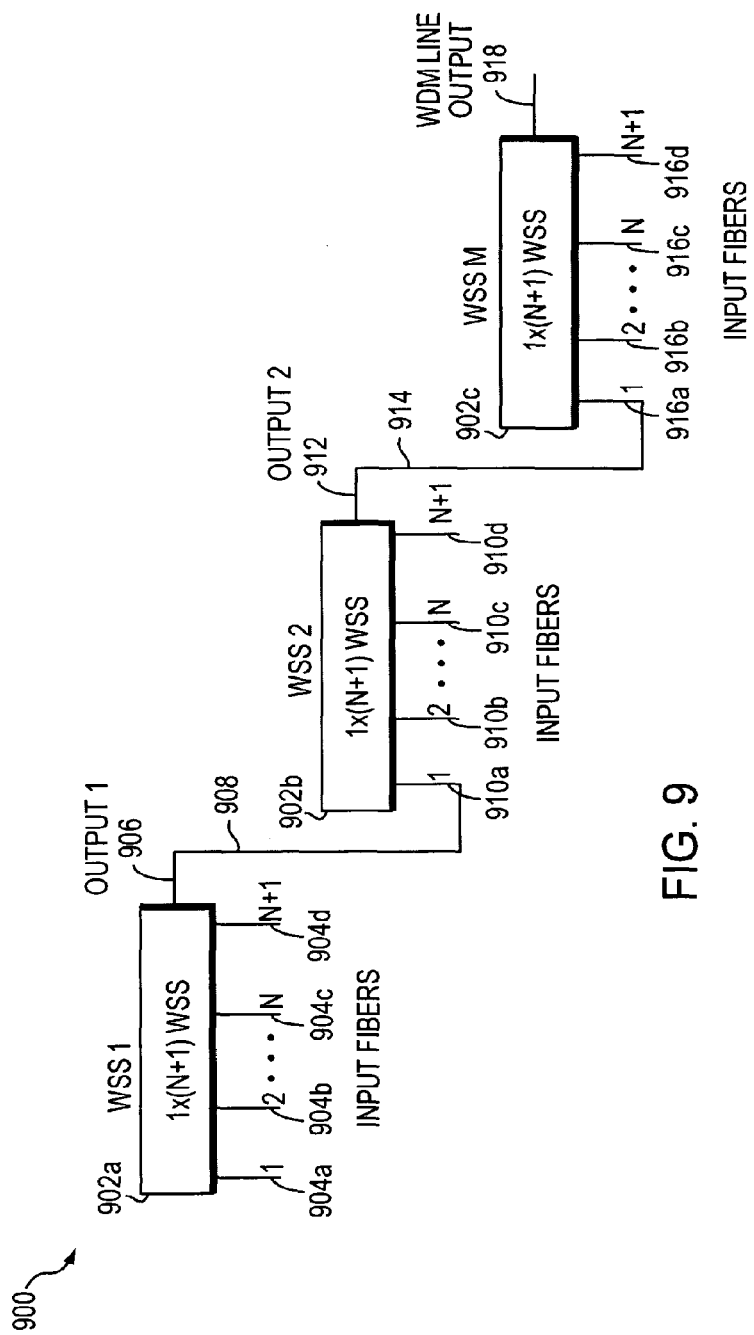
FIG. 9 shows an alternative embodiment of an architecture without splitters using 1×(N+1) WSSs with an extra output.

FIG. 9 is a high level schematic diagram that shows a cascading WSS architecture 900 similar to FIG. 8, except that the size of the WSSs 902a-c on the output stage is 1×(N+1) compared to the WSS size of the input stage (1×N). By using the larger WSSs 902a-c on the output stage cascade architecture 900, only M WSSs—an identical number to the combiner architecture illustrated in FIG. 7—are needed instead of the M+K WSSs needed in a cascading WSS architecture where the WSSs of the input and output stages are of the same size. Here, the effective total number of input fibers 904a-d, 910a-d, 916a-d coupled to output line 918 is (N×M)+1. Although the architecture of FIG. 9 eliminates the additional WSSs from FIG. 8, the problem of equalization still exists.

It is important to note that embodiments of the present application may be accomplished without WSSs by using other discrete optical components to perform WSS functions.

While this invention has been particularly shown and described with references to example embodiments thereof, it will be understood by those skilled in the art that various changes in form and details may be made therein without departing from the scope of the invention encompassed by the appended claims.

What is claimed is:

1. A system for switching optical signals containing subbands of optical wavelengths, the system comprising:
   a first plurality of blocking wavelength selective switches (WSSs), each including (i) a first interface with an input port configured to receive optical signals containing subband optical wavelengths received at input lines of the system and (ii) a second interface with a plurality of output ports;
   a second plurality of blocking WSSs, including (i) a first interface with an output port configured to output the subbands of optical wavelengths or combinations thereof toward output lines of the system and (ii) a second interface with a plurality of input ports;
   splitters optically coupled to the first plurality of blocking WSSs and combiners optically coupled to the second plurality of WSSs, and wherein either (i) the splitters are optically coupled to input ports of the first plurality of WSSs and the combiners are optically coupled to input ports of the second plurality of WSSs, or (ii) the splitters are optically coupled to output ports of the first plurality of WSSs and the combiners are optically coupled to output ports of the second plurality of WSSs; and
   optical paths associating output ports of the second interface of the first plurality of blocking WSSs with input ports of the second interface of the second plurality of blocking WSSs, wherein the first and second pluralities of WSSs, splitters, combiners, and optical paths define an arrangement that causes subbands of optical wavelengths to be split/combined and switched between the input lines and output lines of the system to form reconstituted, switched, optical signals at output lines of the system.

2. The system of claim 1, wherein the splitters each have an input port and a plurality of output ports, the splitters optically coupled, via respective input ports, to respective output ports of the second interface of the first plurality of blocking WSSs; and
   wherein the optical paths are optically coupled to respective output ports of the splitters coupled to the first plurality of blocking WSSs.

3. The system of claim 1, wherein the splitters each have an input port and a plurality of output ports, the splitters optically coupled, via respective output ports, to respective input ports of the first interfaces of the first plurality of blocking WSSs; and
   wherein the optical paths are optically coupled to respective output ports of the second interface of the first plurality of blocking WSSs.

4. The system of claim 1, wherein the combiners each have an output port and a plurality of input ports, the combiners optically coupled, via respective input ports, to respective output ports of the first interfaces of the second plurality of blocking WSSs; and wherein the optical paths are optically coupled to respective input ports of the second interface of the second plurality of blocking WSSs.

5. The system of claim 1, wherein the combiners each have an output port and a plurality of input ports, the combiners optically coupled, via respective output ports, to respective input ports of the second interface of the second plurality of blocking WSSs; and wherein the optical paths are optically coupled to respective input ports of the combiners.

6. The system of claim 1, wherein the optical paths include an optical switch.

7. The system of claim 1, wherein the splitters each have an input port and a plurality of output ports, the splitters optically coupled, via respective input ports, to respective output ports of the second interface of the first plurality of blocking WSSs;

wherein the combiners each have an output port and a plurality of input ports, the combiners optically coupled, via respective input ports, to respective output ports of the first interfaces of the second plurality of blocking WSSs; and wherein the optical paths are optically coupled to respective output ports of the splitters coupled to the first plurality of blocking WSSs and to respective input ports of the second interface of the second plurality of blocking WSSs.

8. The system of claim 1, wherein the splitters each have an input port and a plurality of output ports, the splitters optically coupled, via respective output ports, to respective input ports of the first interfaces of the first plurality of blocking WSSs;

wherein the combiners each have an output port and a plurality of input ports, the combiners optically coupled, via respective output ports, to respective input ports of the second interface of the second plurality of blocking WSSs; and wherein the optical paths are optically coupled to respective output ports of the second interface of the first plurality of blocking WSSs and to respective input ports of the combiners.

* * * * *